United States Patent [19]
Paucksch et al.

[11] 3,725,475
[45] Apr. 3, 1973

[54] PROCESS OF PREPARING FLUORINE CONTAINING PERHALOGENCARBOXYLIC ACID FLUORIDES OR CHLORIDES

[75] Inventors: Heinrich Paucksch, Langenhagen; Joachim Massonne, Hannover; Horst Bohm, Thonse; Gunter Fernschild, Hannover, all of Germany

[73] Assignee: Kali-Chemie Aktiengesellschaft, Hannover, Germany

[22] Filed: Apr. 6, 1970

[21] Appl. No.: 31,048

[30] Foreign Application Priority Data

Apr. 5, 1969 Germany..................P 19 17 630.8

[52] U.S. Cl.............................260/544 F, 260/544 Y
[51] Int. Cl.................................................C07c 51/58
[58] Field of Search................260/544 F, 544 Y, 408

[56] References Cited

UNITED STATES PATENTS 3,160,659  12/1964  Dittman.............................260/544

*Primary Examiner*—Lorraine A. Weinberger
*Assistant Examiner*—Richard D. Kelly
*Attorney*—Michael S. Striker

[57] ABSTRACT

Process of preparing fluorine containing perhalogencarboxylic acid fluorides or chlorides having the formula:

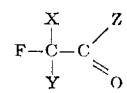

in which X if F, Cl or R, Y is F or R, Z is F or Cl and R is $CF_2X(CFX)_n$ wherein $n$ is 0 to 7, by reacting a fluorochloroalkane having the formula:

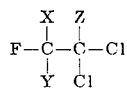

in which X and Y are as above defined with $SO_3$ in a mol ratio of fluorochloroalkane to $SO_3$ of 1:1 to 1:1.5, comprising continuously conducting such fluoroalkane through a mixture of liquid $SO_3$ and $SO_2Cl_2$ and/or $S_2O_5Cl_2$ present in a volume ratio of 1:0.05 to 1:20 and to which there is preferably added catalytic amounts of $HgSO_4$ and/or concentrated $H_2SO_4$ at a temperature of between 0° and 200° C and during the reaction maintaining a part by volume of 5 to 95 percent $SO_2Cl_2$ and/or $S_2O_5Cl_2$ in the reaction mixture.

6 Claims, 1 Drawing Figure

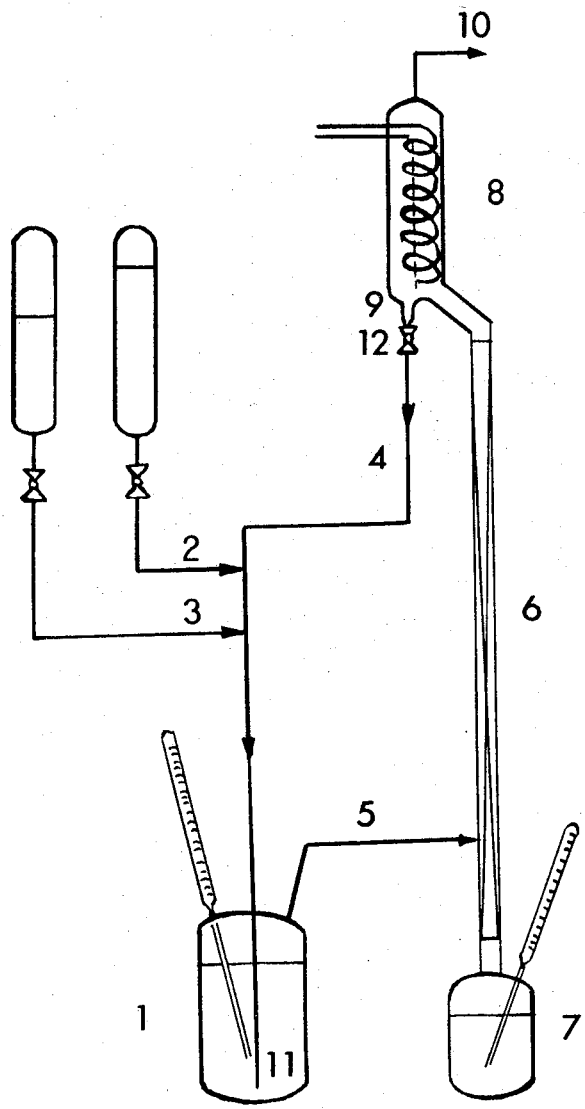

PROCESS OF PREPARING FLUORINE CONTAINING PERHALOGENCARBOXYLIC ACID FLUORIDES OR CHLORIDES

The invention relates to a process of preparing fluorine containing perhalogencarboxylic acid fluorides or chlorides.

In U.S. Pat. No. 3,160,659, a process is disclosed for obtaining perfluoroacetylchloride by slowly introducing oleum or $SO_3$ into trifluorotrichloroethane containing $HgSO_4$ as catalyst at reflux temperature and then maintaining the reaction mixture under reflux at the boiling point thereof for long periods. After an hour of such treatment trifluoroacetylchloride begins to distill off. In order to complete the reaction several days are required. With somewhat increased reaction speeds, difluorochloroacetylchloride can be prepared from $CF_2ClCCl_3$. Fluorine containing perhalogencarboxylic acid halogenides can be obtained by solvolysis of compounds containing as end group $CCl_3-$ or $CFCl_2$ only with great difficulty. The reaction mechanism has not heretofore been described.

It has already been suggested to prepare perhalogencarboxylic acid halogenides by reacting perhalogen compounds containing $CFBr_2-$ or $CClBr_2$ as end groups with oleum. In this procedure, the yields are very unsatisfactory. The separation of the desired perhalogencarboxylic acid halogenides from the by-products formed in the reaction is carried out only with difficulty. According to another known process, perhalogenalkanes containing $CF_2I$ end groups are reacted with fuming sulfuric acid. There are always obtained in this reaction mixtures of perhalogencarboxylic acids containing fluorine. A further disadvantage of these processes for preparing fluorine containing perhalogencarboxylic acid halogenides is that they can only be carried out discontinuously.

Fluorine containing perhalogencarboxylic acid halogenides have heretofore mainly been obtained by treatment of the corresponding carboxylic acid with a halogenating agent as for example, phosphorouspentachloride.

The preparation of fluorine containing perhalogencarboxylic acids by solvolysis also involves difficulties. It is relatively easy to carry out the solvolysis of perchlorinated aliphatic compounds which contain one or more $CCl_3-$ groups. They can by treatment with moderately concentrated sulfuric acid be converted to carboxylic acids having one or more carboxyl groups, as has been described by H. Henecka, Houben-Weyl, Methods of Organic Chemistry, Vol. 8, p. 427. If there is present in the vicinity of a $CCl_3-$end group, one or more fluorine atoms, a carboxylic acid compound is formed only when free $SO_3$ containing sulfuric acid or $SO_3$ is used. By varying the $SO_3-$ content of the sulfuric acid, the $SO_3-$ amount in relation to the halogenalkane, the reaction temperature or reaction time, the process can be improved so that it can be technically applied. The reactions are in part carried out in the absence and in part in the presence of catalysts such as $HgSO_4$ (U.S. Pat. Nos. 2,396,076 and 3,102,139). The reaction speeds of these discontinuous processes are however always unacceptable. A further disadvantage associated with these processes is the difficulty associated with the recovery of the acids from the reaction mixture. In general, the reaction mixtures are diluted with water and the acids recovered therefrom by timely and costly extraction procedures. Very often the acids undergo decomposition during this working up so that the yields are even further decreased.

In accordance with the invention, it has now been found that fluorine containing perhalogencarboxylic acid fluorides or chlorides can be obtained directly in good yield by solvolysis of fluorochloroalkanes. In the process, fluorine containing perhalogencarboxylic acid fluorides or chlorides having the formula

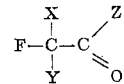

in which X is F, Cl or R, Y is F or R, Z is F or Cl and R is $CF_2X(CFX)_n$, wherein $n$ is 0 to 7 are prepared by continuously conducting a fluoroalkane having the formula

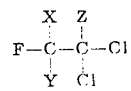

wherein X, Y and Z are as just defined and $SO_3$ in a mol ratio of 1:1 to 1:1.5 through a reaction mixture prepared from mixtures of liquid $SO_3$ and $SO_2Cl_2$ and/or $S_2O_5Cl_2$ in a volume ratio of 1:0.05 to 1:20, into which catalytic quantities of mercury sulfate and/or concentrated sulfuric acid are preferably introduced, at a temperature between 0° and 200° C, whereby during the reaction, a part by volume of 5 to 95 percent $SO_2Cl_2$ and/or $S_2O_5Cl_2$ is maintained in the reaction mixture.

It has been established that under maintenance of these reaction conditions, the solvolysis proceeds according to the following reaction scheme:

$$CF_3CCl_3 + SO_3 \rightarrow CF_3COCl + SO_2Cl_2 \quad (1)$$

Small amounts of $S_2O_5Cl_2$ are formed as by-product in the reaction.

The described fluorochloroalkanes are in gaseous or liquid state, simultaneously and continuously introduced with the gaseous or liquid $SO_3$ into the reaction mixture. In the simplest case of liquids, $SO_3$ and $SO_2Cl_2$ are used in a volume ratio of 1:0.05 to 1:20. If higher reaction temperatures are to be used, it is advantageous for the $SO_2Cl_2$ to be partially or entirely replaced by $S_2O_5Cl_2$. The presence of sulfuryl-chloride and/or disulfurylchloride in the reaction mixture has the result that the fluorochloroalkanes form with the $SO_3$ a homogeneous reaction mixture. There thereby results that the reaction of the fluoroalkane with the $SO_3$ starts and continues for long periods of time at a constant velocity. In addition, the sulfurylchloride and the disulfurylchloride exert a stabilizing effect on the gaseous and also the liquid $SO_3$ so that spontaneous polymerization thereof at room temperature to form solid $SO_3$ is diminished.

Preferably the reaction of the fluoroalkane with the $SO_3$ is carried out in the presence of catalytic amounts of mercury sulfates such as $Hg_2SO_4$, $HgSO_4$ or mixtures thereof. Most suitable are the mixtures of $Hg_2SO_4$ and $HgSO_4$. The presence of the mercury sulfate in the reaction mixture has a very favorable effect on the conduction of the reaction. Amounts of the $Hg_2SO_4$ and $HgSO_4$ in excess of 20 g/liter of the starting reaction mixture do not bring about any further control or regulation of the reaction speed. Preferably, mixtures are used which contain between 1.0 and 10.0 g of each of the two mercury compounds per liter of starting reaction mixture.

It has further been demonstrated that the reaction can be favorably influenced by the presence of catalytic quantities of concentrated sulfuric acid. The sulfuric acid in even limited amounts exerts a stabilizing effect against any traces of moisture present in the reaction mixture. In order to obtain a higher reaction rate between 1 and 20 volume percent and preferably 1 and 10 volume percent of concentrated sulfuric acid calculated on the starting reaction mixture, are used. Increasing the amount of the sulfuric acid has no further effect on the reaction rate.

Particularly good yields are recovered when the reaction of the fluoroalkane with the $SO_3$ is carried out in the presence of suitable quantities of mercury sulfate and concentrated sulfuric acid in the starting mixture.

The reaction is carried out in the temperature range of between about 0° and 200°C. At temperatures under 0°C, the reaction rate is so slow that operating in this range is not expedient. At temperatures in excess of 200°C, the acid halogenides already partially undergo decomposition so that attempting to carry out the reaction at such elevated temperatures is impractical. Preferably the reaction is conducted at temperatures between 50° and 150°C.

The process can be carried out continuously or semicontinuously. In accordance with the process of the invention, the fluoroalkanes are introduced into the reaction mixture together or separate from the required amount of $SO_3$. Preferably the two components are conducted into the deepest point of the reaction mixture. The reaction product remains in the reaction vessel. After the addition of the reaction components is stopped, the reaction product is separated off by distillation.

A semi-continuous introduction is possible in the case where the carboxylic acid halogenide product has a lower boiling point than the $SO_3$. In such case, the acid halogenide is drawn off over a gas form condenser and the excess reaction product after condensation recycled into the reaction vessel.

The complete capacity of the process is seen from the continuous processing. In this connection, pressures and temperatures are so selected that the acid halogenide, $SO_2Cl_2$ and, if necessary, the $S_2O_5Cl_2$ can be taken out of the reaction mass in which they are formed. Simultaneously, the unreacted fluoroalkane and $SO_3$ can be distilled off. In this manner, the volume and the composition of the reaction liquids can be kept constant and a uniform conversion of the continuously introduced reaction components ensured. The mixture taken off from the reactor can be separated into its components by distillation and thereafter continuously introduced into the reaction vessel with starting products i.e., fluorochloroalkane and $SO_3$.

The yields in accorcance with the process of the invention are very satisfactory. There can, for example, be obtained from $CF_3CCl_3$ at a temperature of about 60°C and with a high reaction speed substantially quantitative amounts of $CF_3COCl$. A productivity of 0.5 mol $CF_3COCl$/mol $SO_3$/hr can thereby be realized.

In comparison with the process of Example 2 of U.S. Pat. No. 3,160,659, this productivity amounts to a 200-fold increase.

A possible manner of carrying out the process of the invention has been illustrated in the drawing forming a part of this disclosure.

In accordance with the process of the invention, there is introduced into a heatable reactor 1 filled with reaction mixture, for instance for the preparation of trifluoroacetylchloride from the storage container via conduits 2 and 3 through the dip tube 11, trifluorotrichloroethane and $SO_3$ in a continuous manner in a predetermined mol ratio. The reaction product trifluoroacetylchloride and $SO_2Cl_2$ escapes together with the excess $SO_3$ and any unreacted trifluortrichloroethane from the reactor via conduit 5 and is introduced into the rectifying column 6 where a separation of the gas mixture takes place. In the column, the temperature is so controlled that the higher boiling compounds such as $SO_2Cl_2$ and $S_2O_5Cl_2$ are collected in the still 7 and the lower boiling compounds taken off from the head of the column to a condensor 8.

A further separation of the gas mixture takes place in the condensor. The higher boiling components $SO_3$ and trifluorotrichloroethane are collected together with some $SO_2Cl_2$ at the foot 9 of the condensor, from which a part thereof are returned into the rectifying column 6 and a part over the conduit 4 and the dip tube 11 reintroduced into the reactor 1. Through the valve 12, the amounts of the material returned into the reactor 1, can be regulated.

The trifluoroacetylchloride escapes at the head of the condensor and is led after passage through a washing vessel into a storage container.

The process of the invention will be further illustrated by the following examples which are not to be construed as limiting the scope thereof in any way.

EXAMPLE 1

Semi-continuous Preparation of $CF_3COCl$

A mixture of 4 mol $SO_3$, 0.5 mol $SO_2Cl_2$, 0.25 mol $H_2SO_4$ and 1 g of each of $HgSO_4$ and $Hg_2SO_4$ are contained in a 1 l round flask equipped with a dip tube and a reflux cooler which is held at an inner temperature of 60°C with the help of an oil bath. The reflux cooler is cooled to −18°C. $CF_3CCl_3$ and $SO_3$ in a mol ratio of 1:1.3 are continuously introduced therein through the dip tube. The $CF_3COCl$ which is formed escapes in gas form through the reflux cooler, passes through a washing flash containing concentrated $H_2SO_4$ for absorbing any entrained $SO_3$ and is then condensed at −60°C. From 310 g $CF_3CCl_3$, there were thusly recovered within 1 hour 210 g $CF_3COCl$. The yield amounts to 96 percent of theory.

EXAMPLE 2

Continuous Preparation of $CF_3COCl$

The aforedescribed apparatus is used for the continuous preparation of $CF_3COCl$. There are present in the reactor at the start, a mixture composed of 4 mol $SO_3$, 0.5 mol $SO_2Cl_2$, 0.5 mol $H_2SO_4$ and 1 g each of $HgSO_4$ and $Hg_2SO_4$. The mixture is kept at a temperature of about 65° C. There are continuously introduced through the dip tube 1 mol $CF_3CCl_3$ and 1.2 mol $SO_3$ per hour. The escaping reaction mixture is fed into the rectifying column, the still temperature of which is held at about 90° C. At the head of the condenser, $CF_3COCl$ is continuously drawn off and conducted through a washing flash containing $H_2SO_4$ and then into a cooler having a temperature of −60° C. In the cooler, 0.95 mol $CF_3COCl$/hr are condensed. There are collected in the still of the column a mixture of $SO_2Cl_2$ and $S_2O_5Cl_2$. Unreacted $CF_3CCl_3$ and $SO_3$ after condensation in the cooler are returned to the reactor.

The apparatus was operated for about 50 hours without any change in the reaction speed. The volume of the reaction mixture remains constant during the experimental period.

EXAMPLE 3

Interrupted Preparation of $CF_2ClCOCl$

Using the apparatus as described in Example 1, there is present in a reaction flash a mixture of 5 mol $SO_3$, 0.4 mol $SO_2Cl_2$, 0.25 mols $H_2SO_4$ and 1 g of each of $Hg_2SO_4$ and $HgSO_4$. The mixture has a temperature of 50° C. There are introduced continuously through the dip tube 1.8 mol $SO_3$ and 1.5 mol $CF_2ClCCl_3$ dissolved in a small amount of $SO_2Cl_2$ per hour. After 2 hours, the run is broken off and the flash's contents distilled off. 430 g $CF_2ClCOCl$ pass over between 20° and 25° C. The yield amounts to 96.3 percent of theory calculated on the charged $CF_2ClCC_3$.

EXAMPLE 4

Continuous Preparation of $CF_2ClCOF$

Using the apparatus described in Example 2, 0.3 mol $CF_2Cl_2CFCl_2$ and 0.4 mol $SO_3$ per hour are introduced into the same reaction mixture as described in Example 2. After 2 hours, 0.5 mol $CF_2ClCOF_4$ condenses out in the mixture cooled to −60° C.

EXAMPLE 5

Continuous Preparation of $CF_2ClCFClCOCl$

A mixture composed of 4 mol $SO_3$, 0.3 mol $SO_2Cl_2$, 0.8 mol $S_2O_5Cl_2$, 0.5 mol $H_2SO_4$ and 1 g of each of $HgSO_4$ and $Hg_2SO_4$ are heated to 80° C in an apparatus as described in Example 2. Under maintenance of this temperature, there are introduced through the dip tube 1 mol $CF_2ClCFClCCl_3$ and 1.4 mol $SO_3$ continuously per hour. The components distilling out of the reactor are introduced into the column. There are collected in the still in addition to the $SO_2Cl_2$, also the acid halogenide $CF_2ClCFClCOCl$ which is higher boiling than the $SO_3$. The $SO_2Cl_2$ and $CF_2ClCFClCOCl$ are separated from one another by rectification. The yield amounts to about 84 percent.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims. Similar results were also obtained with different amounts with the claimed ranges.

What is claimed as new and desired to be protected by Letters Patent is set forth in the appended claims:

1. Process for preparing fluorine containing perhalogencarboxylic acid fluorides and chlorides having the formula

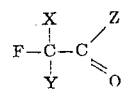

wherein X is F, Cl or R, Y is F or R, Z is F or Cl and R is $CF_2X(CFX)_n$ wherein $n$ is 0 to 7 comprising conducting a fluorochloroalkane having the formula

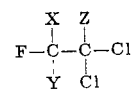

wherein X, Y and Z are as above defined together with $SO_3$ in a relative mol ratio of the two compounds of 1:1 to 1:1.5 through a mixture of liquid $SO_3$, and either $SO_2Cl_2$ or $S_2O_5Cl_2$ or a mixture of the latter two compounds in a volume ratio of to between 1:0.05 and 1:20, in which mixture catalytic amounts of a mercury sulfate and of concentrated $H_2SO_4$ are present and carrying out the reaction at a temperature between 0° and 200° C and maintaining during the reaction an amount of 5 to 95 percent by volume of the component in the mixture.

2. Process according to claim 1 wherein the temperature is maintained at from 50° to 150° C.

3. Process according to claim 1 wherein as mercury sulfate catalyst $HgSO_4$ and/or $Hg_2SO_4$ are used and the total amount of mercury sulfate amounts to up to 40 g per liter of starting reaction mixture.

4. Process according to claim 3 wherein said mercury sulfate is present in an amount of up to 20 g per liter of starting material.

5. Process according to claim 1 wherein said sulfuric acid is present in an amount of up to 20 volume percent based on the starting reaction mixture.

6. Process according to claim 1 which comprises using temperatures and pressures so that the reaction volume is maintained constant, continuously distilling off the reaction product and the unreacted fluorochloroalkane and $SO_3$ from the reaction mixture, recovering the fluorinated perhalogencarboxylic acid chloride or fluoride from the mixture containing the same in a connected distillation column and recycling the unreacted fluorochloroalkane and $SO_3$ into the reaction.

* * * * *